(12) United States Patent
Tian et al.

(10) Patent No.: US 9,122,647 B2
(45) Date of Patent: Sep. 1, 2015

(54) SYSTEM AND METHOD TO BACKUP OBJECTS ON AN OBJECT STORAGE PLATFORM

(71) Applicant: Dell Products L.P., Round Rock, TX (US)

(72) Inventors: Xiaoyang Tian, Austin, TX (US); Srikanth Nandigam, Round Rock, TX (US); Wendy Chen, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 180 days.

(21) Appl. No.: 13/652,675

(22) Filed: Oct. 16, 2012

(65) Prior Publication Data

US 2014/0108717 A1   Apr. 17, 2014

(51) Int. Cl.
 *G06F 12/00* (2006.01)
 *G06F 12/16* (2006.01)
 *G06F 3/06* (2006.01)
 *G06F 11/14* (2006.01)

(52) U.S. Cl.
 CPC  *G06F 12/16* (2013.01); *G06F 3/06* (2013.01); *G06F 3/0604* (2013.01); *G06F 3/065* (2013.01); *G06F 3/0685* (2013.01); *G06F 11/14* (2013.01)

(58) Field of Classification Search
 CPC .................................. G06F 12/00; G06F 12/16
 USPC .......... 711/108, 162, 203, E12.001, E12.025, 711/E12.026, E12.066, E12.103, 154; 707/999.103, 999.102
 See application file for complete search history.

(56) References Cited

U.S. PATENT DOCUMENTS

| | | | | |
|---|---|---|---|---|
| 6,148,383 | A * | 11/2000 | Micka et al. | 711/162 |
| 6,353,878 | B1 * | 3/2002 | Dunham | 711/162 |
| 6,625,704 | B2 * | 9/2003 | Winokur | 711/162 |
| 7,552,358 | B1 * | 6/2009 | Asgar-Deen et al. | 714/6.1 |
| 2002/0178173 | A1 * | 11/2002 | Chefalas et al. | 707/200 |
| 2005/0204108 | A1 * | 9/2005 | Ofek et al. | 711/162 |
| 2008/0313236 | A1 * | 12/2008 | Vijayakumar et al. | 707/200 |
| 2009/0210458 | A1 * | 8/2009 | Glover et al. | 707/202 |
| 2010/0333116 | A1 * | 12/2010 | Prahlad et al. | 719/328 |
| 2012/0084524 | A1 * | 4/2012 | Gokhale et al. | 711/162 |

OTHER PUBLICATIONS

Mesnier et al, "Object-Based Storage", IEEE Communications Magazine, Aug. 2003, pp. 84-90.*

* cited by examiner

*Primary Examiner* — Cheng-Yuan Tseng
*Assistant Examiner* — Kamal K Dewan
(74) *Attorney, Agent, or Firm* — Isidore PLLC

(57) ABSTRACT

A method and system enable tape back-up of objects stored to an object storage platform and also enable efficient backup to a secondary storage device data objects. An offline-replica bit within a metadata of an object being stored is set to a first value, indicating that the stored object is available for secondary storage to a second storage device. In response to receiving a request for backup of one or more objects from the object storage platform: the storage controller: identifies which objects have an offline-replica bit value that is the first value; and provides only those objects requested that have their offline-replica bit value equal to the first value. An external backup tracking mechanism identifies which objects have been backed-up to the secondary storage, and only those objects that have not previously been backed up are backed up during a subsequent backup request.

12 Claims, 7 Drawing Sheets

| UUID | Metadata | Content |
|---|---|---|
| Content Address | Metadata associated with the content<br>System generated or custom metadata<br>Descriptive information lives with the file<br>Enables automated management<br>Ensure integrity, retention, and authenticity<br><br>HTTP/1.1 200 OK<br>Date: Thu, 26 Jun 2008 21:26:34 GMT<br>Server: CAStor Cluster/2.2<br>Application-Name: MS Word<br>Create-Date: 2008-06-26 21:26:14.687000<br>System-Cluster: Internet Demo Cluster<br>System-Created: Thu, 26 Jun 2008 21:26:20 GMT<br>Content-Disposition: inline; filename=Sports %Segment%206-26-08.doc<br>Content-Length: 8619354<br>Content-type: application/doc<br>lifepoint: [Thu, 03 Jul 2008 21:26:14 GMT] reps=2, deletable=True<br>lifepoint: [] delete<br>Replica-Count: 2<br><br>Offline-Replica: 1/Offline-Replica-meta: 1 | File-based data |

FIG. 4

| Object UUID | Location | Back-up Enabled Bit Value | Other |
|---|---|---|---|
| xxxyyy111 | L1212 | 1 (Y) | |
| yyyvvvw23 | L5469 | 0 (N) | |
| vvvxxxyzy | L0024 | -- (N) | |
| fffvv7zyx | L10473 | 1 (Y) | |

FIG. 5

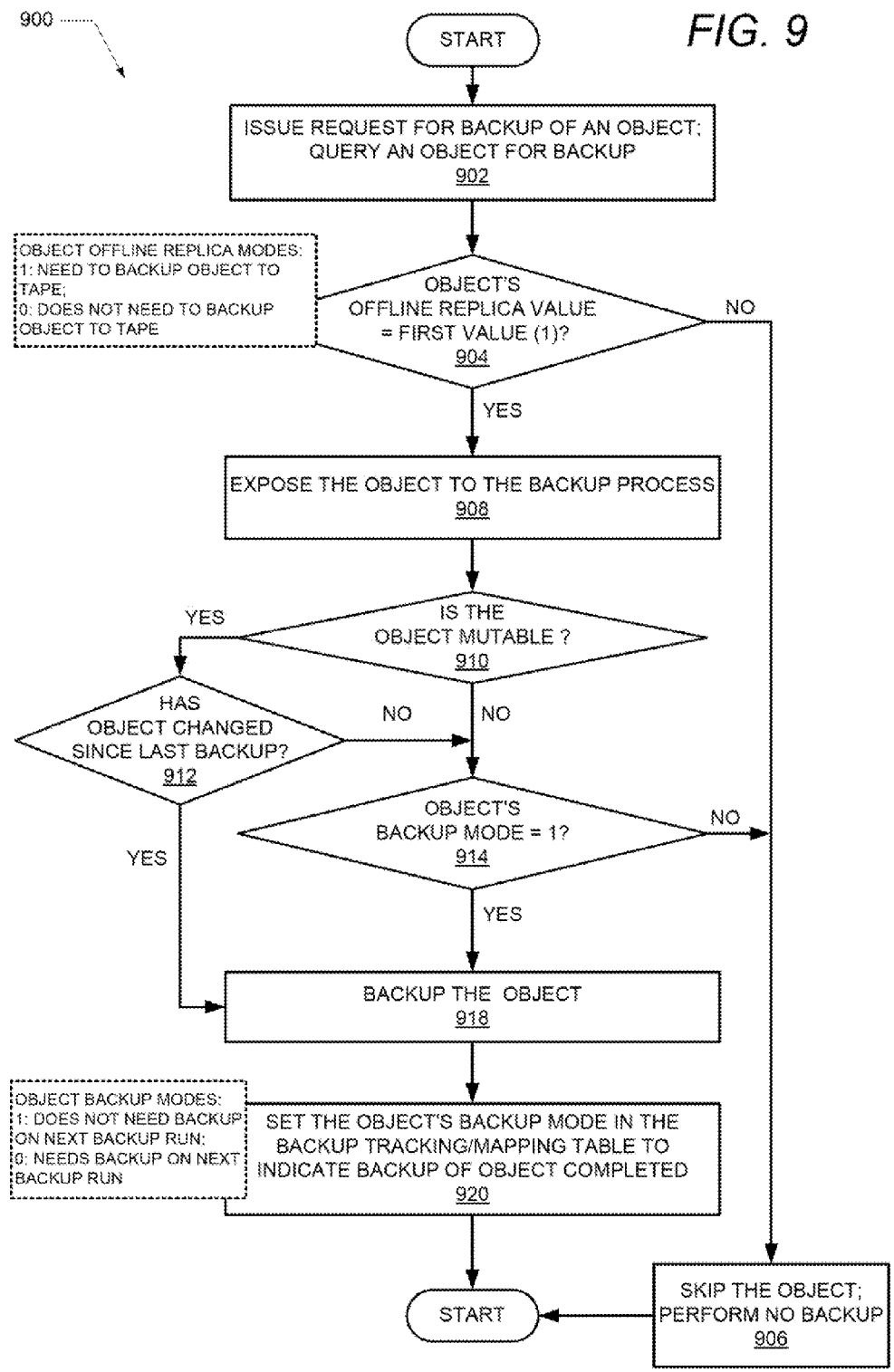

SYSTEM AND METHOD TO BACKUP OBJECTS ON AN OBJECT STORAGE PLATFORM

BACKGROUND

1. Technical Field

The present disclosure generally relates to information handling systems and in particular to data storage mechanisms of information handling systems. Still more particularly the present disclosure relates to enabling back-up of data objects stored on an object storage platform.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One important function performed by information handling systems is the long term storage of data on one or more storage devices. There are many different types of such storage devices and systems implemented in the industry, included large scale storage systems designed for storage of vast amounts of data. One particular type of storage methodology currently in use is the object storage platform, which is primarily designed as a long-term archive storage platform. Object storage platforms provide what is generally referred to in the industry as Content Addressable Storage (CAS) and/or Fixed Content Storage (FCS). With this storage methodology, data is stored on disk rather than on tape. These object storage platforms can create multiple replicas for each object to protect against data loss, but do not support backup of data to a separate tape system. One concern created by this method of data storage is that if the data center in which the storage is installed is lost due to some failure, a complete loss of the data would occur because all replicas of the data will be lost. An available option to mitigate that risk of a full loss of data is to replicate objects to a remote site; however, this option is often expensive to implement and may take a long time to recover data in the event of total loss of the primary storage system.

Also, a large number of businesses require a backup of their data for regulatory compliance. Thus, many businesses use object storage for archive and compliance reasons. With the object storage platform, some objects are written as immutable, which means the object cannot be changed once the object is written. The drawback of not being able to back up the objects stored on the object storage platform to tape makes the use of object storage platforms as a permanent data storage solution not feasible for certain users who prefer or need to have their data backed up to tape.

BRIEF SUMMARY

Disclosed are a method, a storage system, and an information handling system for enabling tape back-up of objects stored to an object storage platform. Also disclosed is a method, storage system, and information handling system for enabling efficient backup to a secondary storage device of immutable data objects stored on an object storage platform.

According to one aspect of the disclosure, the method comprises: a processor of a data processing system receiving a request to store a first set of data to an object storage platform that supports content addressable storage; in response to the request, generating a query for selection of a parameter value indicating whether the first set of data is to be made accessible for secondary storage to a second storage device following an initial storage on the object storage platform; in response to receiving a first value as a response to the query, tagging the first set of data to indicate that secondary storage of the first set of data is approved; and forwarding the first set of data to a storage controller of the object storage platform. The storage controller stores the first set of data as a corresponding first object within the object storage platform and the storage controller identifies the first object as being available for secondary storage.

In one embodiment, the method further comprises: in response to receiving a second value as a response to the query, tagging the first set of data to indicate that secondary storage of the first set of data is not approved; and forwarding the first set of data to a storage controller of the object storage platform. The storage controller stores the first set of data as a corresponding first object within the object storage platform, and the storage controller does not identify the first object as being available for secondary storage. Also, in one embodiment the method further comprises: in response to not receiving a response to the query within a pre-set timeout period, first tagging the first set of data to indicate that secondary storage of the first set of data is not approved; and forwarding the first set of data to the storage controller of the object storage platform. As with the previous embodiment, the storage controller stores the first set of data but does not identify the first object as being available for secondary storage. Also, in response to not receiving a response to the query within a pre-set timeout period, the method includes forwarding the first set of data to a storage controller of the object storage platform, and storing the data without identifying the first object as being available for secondary storage. All data provided to the storage controller that are not expressly tagged to indicate approval for secondary storage are stored as objects with a default to not allow access for secondary storage.

According to one embodiment, tagging the first set of data to indicate that secondary storage of the first set of data is approved comprises: setting an offline-replica bit within a metadata of the first object to a first value that indicates that secondary storage of the first set of data is approved. Also, when the secondary storage is not approved for the first object, the offline-replica bit is automatically set to a second, default value.

Aspects of the disclosure provide an information handling system configured with the processor and program code that when executed by the processor completes the above method functions.

Another aspect of the disclosure provides a method for storing data within an object storage platform. The method comprises: a storage controller of the object storage platform receiving a first set of data for storage on the object storage platform; generating a first object corresponding to the first set of data; assigning a Universally Unique Identifier (UUID) to the first object; checking a value of an offline-replica bit within metadata received with the first set of data and appended to the first object; and in response to the offline-replica bit value being a first value, identifying the first object as being available for secondary storage to a second storage device; and storing the first object within the object storage platform. According to one embodiment, the method further comprises: in response to the value of the offline-replica bit within the metadata being a second value and/or in response to the metadata not containing an offline-replica bit value, storing the first object.

In accordance with a next aspect of the disclosure, the method further comprises: in response to receiving a request for backup of one or more objects from the object storage platform: identifying which of the one or more objects stored within the object storage platform have an offline-replica bit value that is the first value; and providing in response to the request only those objects requested that have the first value as its offline-replica bit value. Accordingly, the method includes ignoring the request for any object without an offline replica bit within its metadata and any object whose offline-replica bit value is not the first value.

One aspect of the disclosure provides a storage controller for an object storage platform, the storage controller comprising a processing unit and firmware that when executed by the processing unit completes the above method functions. Yet another aspect of the disclosure provides an information handling system comprising the storage controller.

Another aspect of the disclosure provides a method for efficient backup of objects from an object storage platform. The method comprises: a processor of an information handling system forwarding a first request to a controller of an object storage platform to back-up data objects that are stored on the object storage platform to a secondary storage device; responsive to receipt of one or more objects from the object storage platform in response to the first request: forwarding the one or more objects to the secondary storage device; and updating a tracking mechanism to identify which objects from the object storage device have been backed-up to the secondary storage. The method further comprises: in response to generating a second request to back up objects from the object storage platform: identifying which objects have been previously backed up; and backing up to the secondary storage device only those objects that have not previously been backed up.

According to one embodiment, updating a tracking mechanism comprises: retrieving a Universally Unique Identifier (UUID) from each object returned by the first request; and registering the UUID within a back-up tracking (or backup mapping) table. Further, identifying which objects have been previously backed up comprises: accessing a listing of UUIDs within the back-up mapping table identifying which objects have been previously backed up; and screening out those objects that have been previously backed up from being backed up in response to the second request and subsequent requests to back up objects from the object storage platform. One aspect of the disclosure provides an information handling system comprising a processor and program code that executes on the processor to perform the above method functions.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. Embodiments incorporating teachings of the present disclosure are shown and described with respect to the figures presented herein, in which:

FIG. 4 illustrates an example object, with metadata configured to include an offline-replica bit, in accordance with one or more embodiments;

FIG. 5 illustrates an example object offline backup status table of a storage controller of the object storage platform, in accordance with one or more embodiments;

FIGS. 8 and 9 are flow charts illustrating processes within computer-implemented methods for performing efficient back-up of immutable objects from an object storage platform to a secondary storage device, according to one or more embodiments.

DETAILED DESCRIPTION

Figure 1:
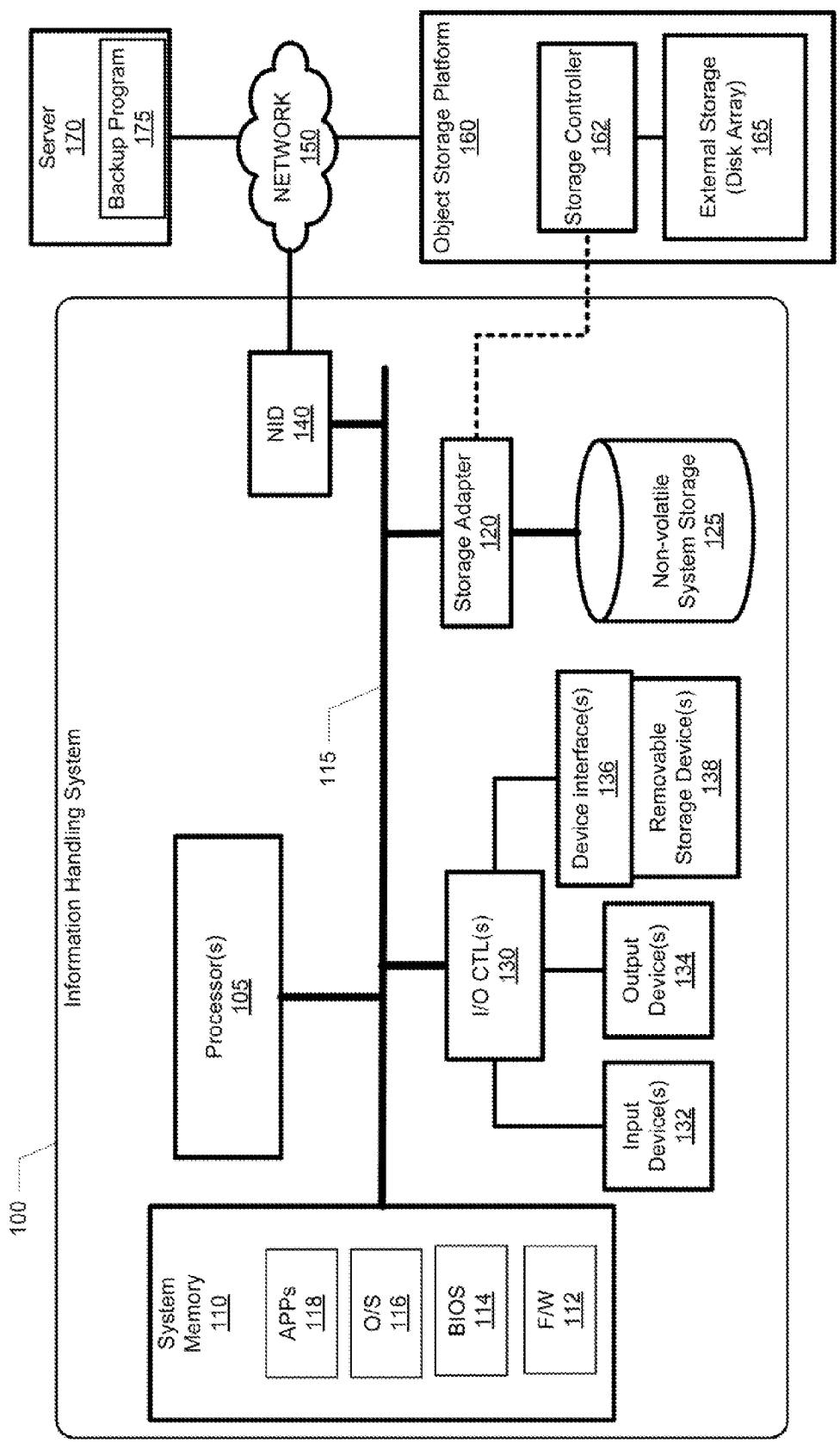
FIG. 1 is a block diagram illustration of an example information handling system and connected object storage platform within which certain aspects of the disclosure can be practiced, according to one or more embodiments.

The illustrative embodiments provide a method, a system, and an information handling system that enable tape back-up of objects stored to an object storage platform (or a content addressable system) and also enable efficient backup to a secondary storage device of immutable data objects from the object storage platform. An offline-replica bit within metadata of an object being stored is set to a first value, indicating that the stored object is available for secondary storage to a second storage device. In response to receiving a request for backup of one or more objects from the object storage platform: the storage controller: identifies which objects have an offline-replica bit value that is the first value; and provides only those objects requested that have their offline-replica bit value equal to the first value. An external backup tracking mechanism identifies which objects have been backed-up to the secondary storage, and only those objects that have not previously been backed up are backed up during a subsequent backup request.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware components and basic configuration depicted in the following figures may vary. For example, the illustrative components within information handling system 100, object storage platform 160, application server 100, etc., are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

It will be appreciated that for simplicity and clarity of illustration, elements illustrated in the figures have not necessarily been drawn to scale. For example, the dimensions of some of the elements are exaggerated relative to other elements.

Various aspects of the disclosure are described from the perspective of an information handling system and a display device of or for use with an information handling system. For purposes of this disclosure, an information handling system, such as information handling system 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

With reference now to the figures, and beginning with FIG. 1, there is depicted a block diagram representation of an example information handling system 100, and connected second devices, within which one or more of the described features of the various embodiments of the disclosure can be implemented. Information handling system 100 includes at least one central processing unit (CPU) or processor 105 coupled to system memory 110 via system interconnect 115. System interconnect 115 can be interchangeably referred to as a system bus, in one or more embodiments. Also coupled to system interconnect 115 is nonvolatile storage (NVRAM) 125, which can have an associated storage adapter 120. Nonvolatile storage 125 can be utilized to store one or more software and/or firmware modules and one or more sets of data that can be utilized during operations of information handling system 100. These one or more software and/or firmware modules can be loaded into system memory 110 during operation of information handling system 100. Specifically, as provided by the illustrative embodiment, system memory 110 can include therein a plurality of such modules, including one or more of firmware (F/W) 112, basic input/output system (BIOS) 114, operating system (O/S) 116, and application(s) 118. These software and/or firmware modules have varying functionality when their corresponding program code is executed by CPU 105 or secondary processing devices (such as a storage adapter) within information handling system 100.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals and/or data to one or more connected output devices 134, such as a monitor or display device or audio speaker(s). Additionally, in one or more embodiments, one or more device interfaces 136, such as an optical reader, a universal serial bus (USB) interface, a card reader, Personal Computer Memory Card International Association (PCM-CIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces such as $I^2C$, SMBus, and peripheral component interconnect (PCI) buses.

Information handling system 100 comprises a network interface device (NID) 140. NID 140 enables information handling system 100 and/or components within information handling system 100 to communicate and/or interface with other devices, services, and components that are located external to information handling system 100. These devices, services, and components can interface with information handling system 100 via an external network, such as example network 150, using one or more communication protocols. Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 provides access to object storage platform 160 and to server 170, which is described hereinafter as backup server 170. Backup server 170 includes therein a backup program 175, whose functionality is described in greater detail in the description of the later figures. According to one embodiment, object storage platform 160 is a content addressable storage and contains one or more objects identified by a unique universal identifier (UUID). The objects can be mutable or immutable, and both types of objects are assumed to be stored within object storage platform 160. In one embodiment, storage adapter 120 of IHS 100 can be directly coupled to object storage platform 160, and particularly to storage controller 162. This direct connection is indicated by the dashed interconnecting lines. Accordingly, object storage platform 160 can be directly connected to IHS 100 as an external storage device. Object storage platform 160 includes external storage 165, which can include a plurality of physical disks (e.g., a disk array) or other storage media. Access to data and/or information on external storage 165 is controlled by storage controller 162.

The present disclosure provides two main functional components/aspects, which are generally described as (1) enabling backup-aware object based storage and (2) enabling an efficient object back-up mode. The first function can also be referred to as providing an object offline replica mode. As described in greater detail hereafter, the object offline replica mode enables CAS systems (object storage platforms) to expose appropriate objects for tape backup. The offline replica mode is identified via a data field that is part of metadata associated with the object. According to one embodiment, an offline replica field is added in the metadata of the data object being stored to the object storage platform. As further described herein, two object offline replica modes are defined: a first mode identified by a first value (e.g., 1), which indicates a need to backup the object to tape; and a second mode identified by a second value (e.g., 0), which indicates that the object should not be backed up to tape.

The second aspect of the disclosure provides a new backup management system that exploits the features of an offline replica mode with object based storage by using a programmed backup policy. As described, the disclosure makes use of attributes of objects to store the backup policy information. Also, because object metadata cannot be modified for immutable objects (i.e., objects which cannot be changed once written), a backup tracking/mapping table is provided within the backup program 175 to enable efficient backup operations on the object storage platform. With the addition of the offline replica field to the metadata of stored data objects, the storage system can expose all objects that require offline replicas to a backup program 175. Also, the backup program 175 can backup objects based on the offline replica metadata and backup mode. The combination of the two aspects of the disclosure enables backup of all object types, as well as flexible backup management.

According to the first aspect of the disclosure, a first process includes providing an object offline replica mode, which enables CAS systems to expose appropriate objects for tape backup. In one embodiment, this mode can be implemented by modifying the instruction set architecture for storing a data object to include additional fields within the metadata associated with the object. Specifically, according to one implementation, a single bit filed within the metadata is allocated to identifying the offline replica mode of the data object. The single bit field can be set to one of two binary values, one (1) and zero (0). In one implementation, in response to the field being set to a logic high or one (1) value, the backup server 170 reads the field as indicating that the data object can or should be backed up. Conversely, in response to the field being set to the zero (0) value, the backup server reads the field as indicating that the data object cannot be copied or replicated outside of the CAS system. Thus, the offline replica mode is a metadata field and can be implemented as the standard metadata, or standard custom metadata. According to one embodiment, an object offline replica mode can be created for each object. A user application generating the files and/or data can decide whether to turn the object backup capability on or off (by setting the offline replica bit to the corresponding value) based on backup requirements. The object backup mode is tracked at the backup host (e.g., storage controller 162) in order to enable different backup strategies.

Based on the implementation of the first aspect of the disclosure, the second aspect of the disclosure builds on the fact that the first aspect has been implemented for one or more data objects. This second aspect involves providing an object backup mode. The object backup mode enables backup programs to backup objects using different backup schemes. The backup mode is maintained in a backup program database. The backup mode enables a user to set backup strategy and control frequency of backup operations. According to one aspect, the object backup modes include one of two values: a first value, e.g., a logic high or one (1) value, which indicates that the data object has already been backed up or does not need backup during the next backup process; and a second value, e.g., a logic low or zero (0) indicating that the data object should be backed up during the next backup process. According to one or more aspects, the backup program 175 can utilize the backup metadata (i.e., the offline replica bit) and the object backup mode to perform copy operations and differential, incremental and full backups, similar to a traditional file system backup.

Figure 2:
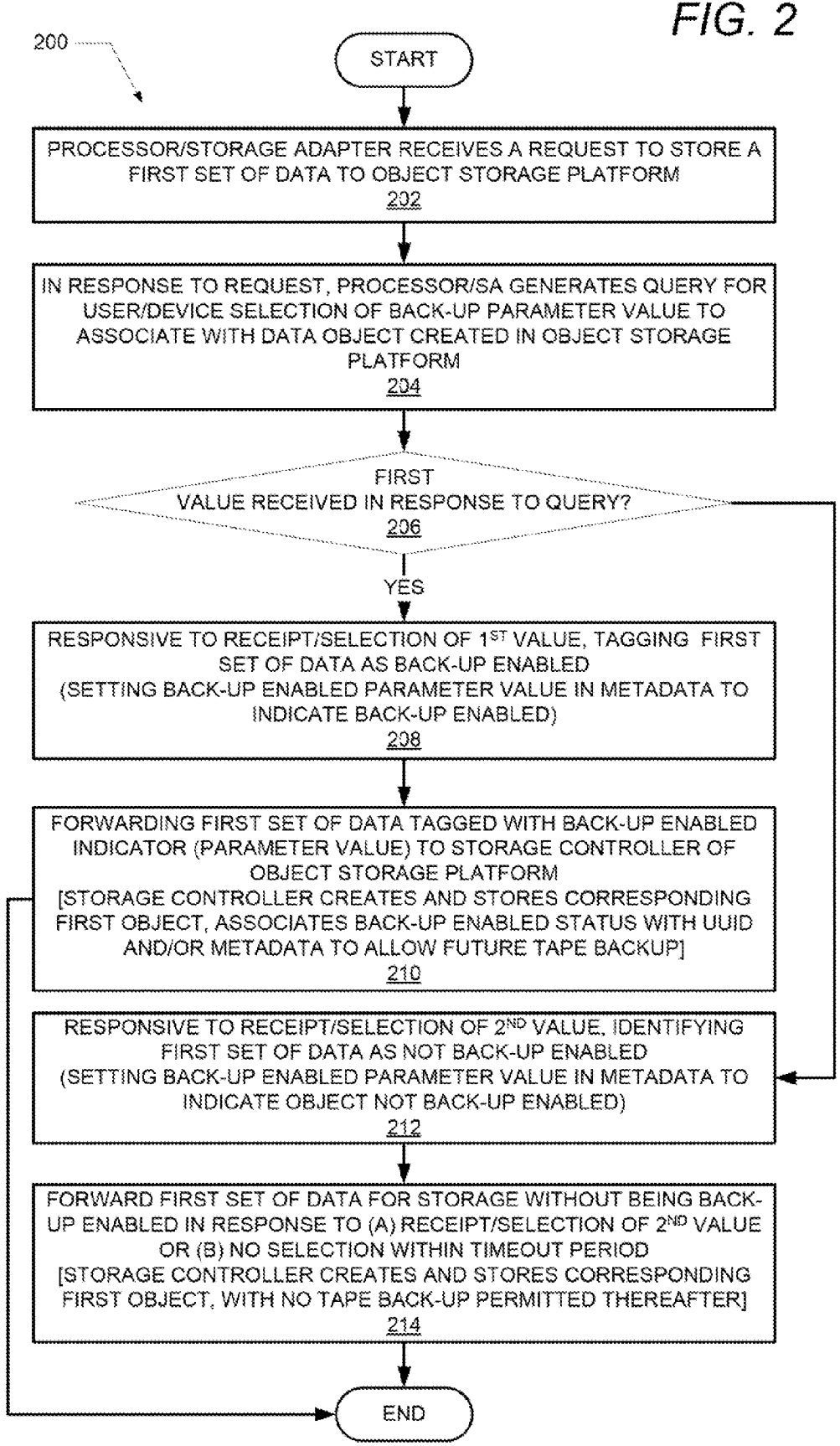
FIG. 2 is a flow chart illustrating processes within a computer-implemented method for identifying an object to be stored within the object storage platform as back-up enabled, according to one or more embodiments.

Referring again to the figures, a first aspect of the disclosure involves a process by which an information handling system, such as the above described example information handling system 100 can be programmed to enable storage of data to the object storage platform with a setting that enables the CAS-stored object to be later retrieved from the object storage platform 160 and stored to a second storage device. The method process performed by the information handling system 100 and storage system (object storage platform 160) enables the persistent data objects within the object storage platform 160 to be backed up to a next storage device. One embodiment of the method by which the information handling system performs this process is illustrated by the flow chart of FIG. 2, which is now described, with reference to the components of FIG. 1. According to the flow chart, method 200 comprises: a processor 105 or storage adapter 120 of information handling system 100 receiving a request to store a first set of data to an object storage platform 160 that supports content addressable storage (block 202); and in response to the request, generating a query for selection/entry of a parameter value indicating whether the first set of data is to be made accessible for secondary storage to a second storage device following an initial storage on the object storage platform (block 204). At decision block 206, the method 200 determines whether the received/entered/selected value in response to the query is a first value. According to one aspect, only two values can be selected, a first value that indicates the first set of data is approved to be moved to a second storage device from the object storage platform, and a second value that indicates the first set of data cannot be moved to a second storage once placed on the object storage platform. In one embodiment, implementing a single bit to hold the values, the first value can be a 1, while the second value is a 0. Alternatively, the first value can be 0, while the second value is 1. Other embodiments can allow for a different pair of values that are possible outside of the single bit implementation.

Returning to the flow chart, method 200 further comprises: in response to receiving the first value in response to the query, tagging the first set of data to indicate that access for secondary storage of the first set of data is approved (i.e., that the corresponding object will be back-up enabled) (block 208). According to one implementation, this process involves setting a backup enabled parameter value (which can be synonymous with the offline-replica bit described herein) within the metadata associated with the first set of data. The method 200 then includes forwarding the first set of data to a storage controller of the object storage platform (block 210). Once the data is received, the storage controller 162 stores the first set of data as a corresponding first object within the object storage platform, and the storage controller 162 identifies the first object, via the offline-replica bit and one or more mechanisms, as being available for secondary storage.

Returning to decision block 206, method 200 comprises: in response to receiving a second value as a response to the query, tagging the first set of data to indicate that secondary storage of the first set of data is not approved/or permitted (block 212). Alternatively in response to not receiving a response to the query within a pre-set timeout period, the method can comprise providing a null value for the parameter of the first set of data to indicate that access for secondary storage of the first set of data is not approved. Method 200 then includes forwarding the first set of data to a storage controller of the object storage platform. The storage controller then stores the first set of data as a corresponding first object within the object storage platform, and the storage controller does not identify the first object as being available for secondary storage (block 214).

According to one embodiment, in response to not receiving a response to the query within a pre-set timeout period, the method includes forwarding the first set of data to a storage controller of the object storage platform. The storage controller then stores the first set of data as a corresponding first object within the object storage platform, and the storage controller does not identify the first object as being available for secondary storage. With this embodiment, all data provided to the storage controller that are not expressly tagged to indicate access for secondary storage are stored as objects with a default to not allow secondary storage.

In one or more embodiments, tagging the first set of data to indicate that secondary storage of the first set of data is approved comprises: setting an offline-replica bit within a metadata of the first object to a first value that indicates that access for secondary storage of the first set of data is approved. Accordingly, when the secondary storage is not approved for the first object, the offline-replica bit is automatically set to a second, default value.

One aspect of the disclosure provides that that above method processes are performed within an information handling system configured with the processor and program code that when executed by the processor completes the various described functions.

Figure 3:
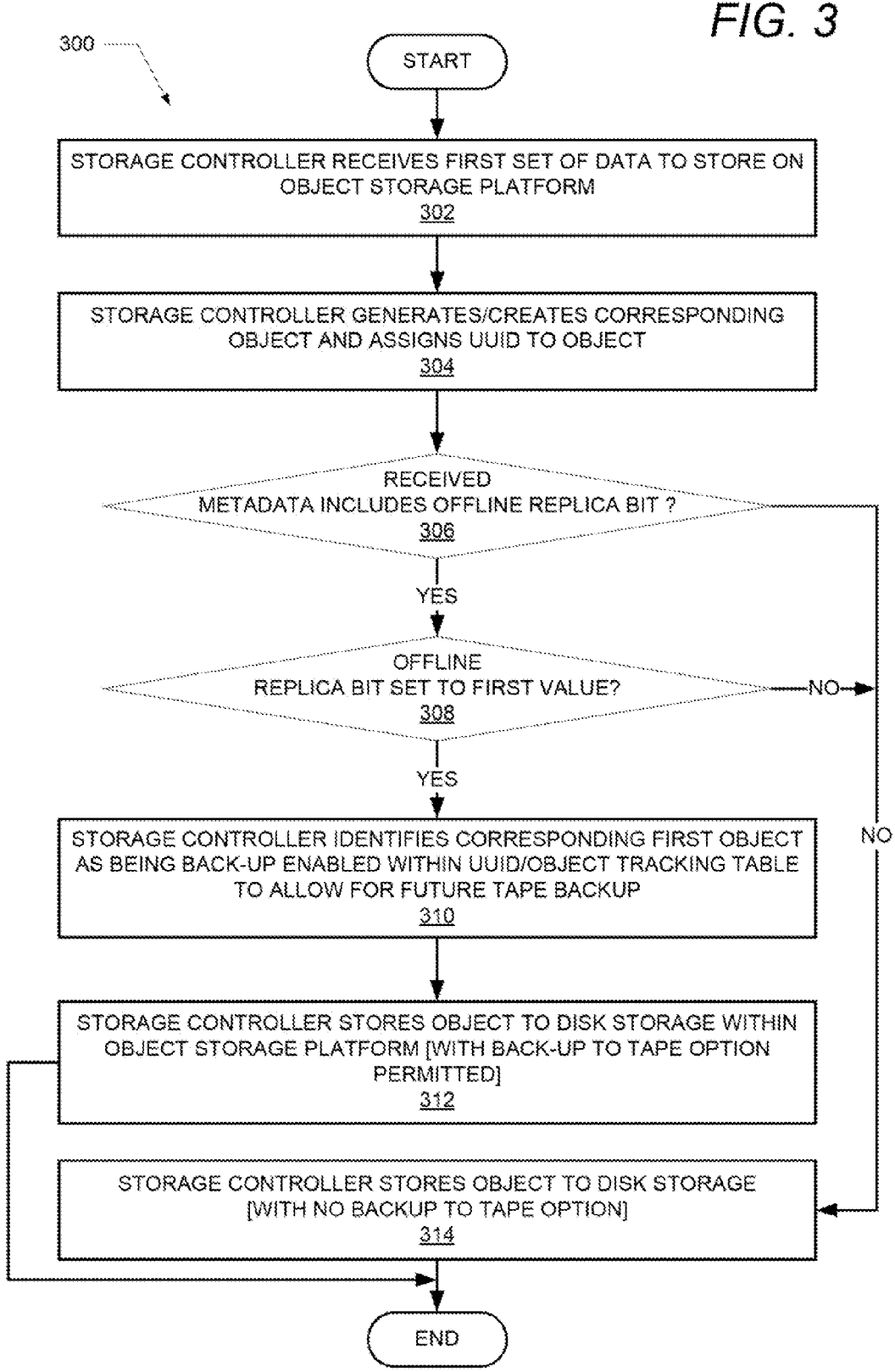
FIG. 3 is a flow chart illustrating processes within a method implemented by a storage controller for identifying which objects within the object storage platform are back-up enabled, according to one or more embodiments.

Turning now to FIG. 3, there is illustrated a flow chart of another method 300 for storing data within an object storage platform 160. Specifically, method 300 describes a process by which a storage controller identifies which stored objects are approved for future storage to a secondary storage device, such as a tape backup storage. Method 300 begins at start block and proceeds to block 302 at which a storage controller of the object storage platform receives a first set of data for storage on the object storage platform. Method 300 then includes storage controller 162 generating a first object corresponding to the first set of data and assigning a Universally Unique Identifier (UUID) to the first object (block 304). Method 300 then checks at decision block 306 whether the metadata that was received as a part of the data header includes an offline-replica bit.

In response to the metadata including an offline-replica bit, method 300 includes a second check by storage controller 162 (block 308) of whether the offline replica bit is set to the first value, which indicates the created object can be accessed and stored to a second storage device. Thus, method 300 includes checking a value of an offline-replica bit within metadata received with the first set of data and appended to the first object.

FIG. 4 provides an example list of metadata 410 appended to or associated with an object 400 that is generated from a received set of data and that is to be stored on the CAS, according to one embodiment. Within object storage platform 160 or CAS, each object is a file, or a collection of files, with rich metadata. Object 400 includes the UUID for the object, metadata 410, and file-based content, i.e., data. As shown, metadata 410 can include a lot of information specific to the data object, including the source of the data object, date of creation, length, and other parameters. Additionally, according to one aspect of the disclosure, metadata 410 also includes offline-replica parameter or bit 415, illustrated in bold to distinguish from the other metadata. As defined and/or described herein, offline-replica bit 415 can have at least two different values, in one or more embodiments.

While example object 400 does include an offline-replica parameter that includes a bit value, other implementations can exclude an offline-replica parameter altogether, and only provide one when programmed to do so. Thus, in one or more embodiments, certain data can include an offline-replica bit, while other data do not include an offline-replica bit. This latter scenario can occur, for instance, where the storage adapter (120) or processor (105) of the source device (e.g., IHS 100) does not include the programming instructions, firmware, or instruction set architecture (ISA) to include an offline-replica bit within the metadata for data being forwarded for storage to the object storage platform 160.

Returning to the flow chart of FIG. 3, at block 310, in response to the offline-replica bit value being a first value, method 300 includes the storage controller 162 identifying the first object as being available for secondary storage to a second storage device (i.e., as being back-up enabled). According to one embodiment, the identifying process involves placing and/or updating an entry within a UUID/object tracking table maintained by storage controller 162. FIG. 5 illustrates an example UUID tracking table 500, which is a data structure in the form of a table, representing control data maintained by storage controller 162 for each object of object storage platform 160. According to the illustrative embodiment, UUID tracking table 500 comprises a plurality of columns with entries related to each object stored within object storage platform 160. These columns include columns for UUID, location, and back-up enabled bit value. Within this representation of UUID tracking table 500, back-up enabled bit value is the same as the bit value of offline-replica bit 415. The presence in table 500 of a null value (as shown in row 3) indicates that the received metadata did not include an offline-replica bit 415, and that null value is treated the same as the value utilized to indicate that back-up is not enabled for the corresponding object. Along with setting the back-up enabled value, method 300 includes the storage controller 162 storing the first object within disk storage 165 of the object storage platform 160 (block 312).

Returning to the decision blocks 306 and 308, in response to either of the two determinations yielding a "no" response (i.e., in response to the metadata not containing an offline-replica bit value or in response to the value of the offline-replica bit within the metadata being a second value), method 300 includes storage controller 162 storing the first object without allowing secondary backup (block 314). Method 300 then ends.

Figures 6, 7:
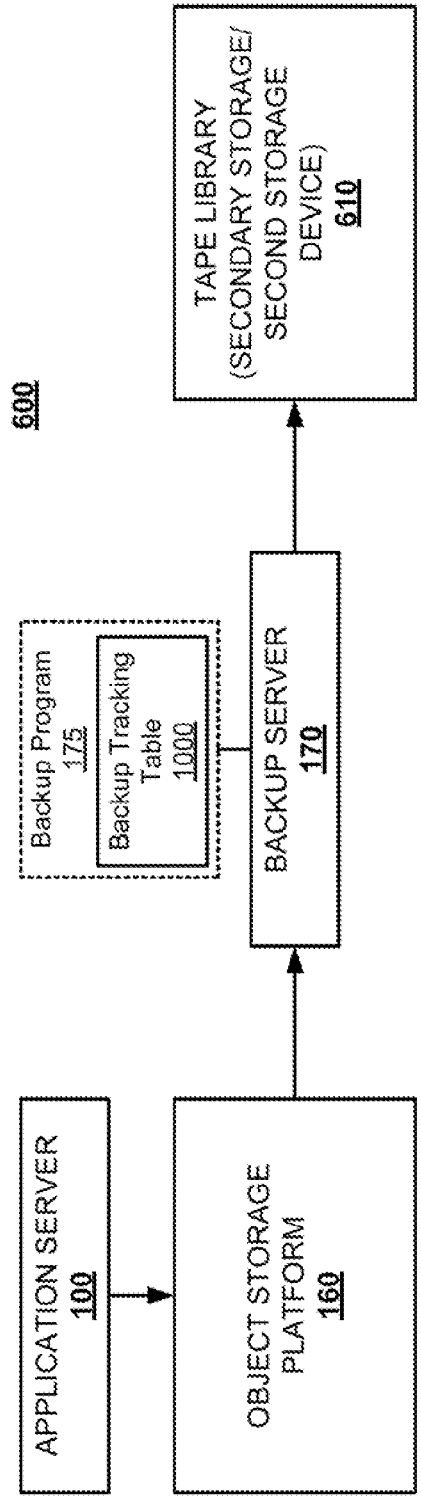
FIG. 6 illustrates a back-up system diagram with the various components that enable back-up of objects from an object storage platform, in accordance with one or more embodiments.
FIG. 7 illustrates an example backup tracking/mapping table hosted by a back-up server, in accordance with one or more embodiments.

With the capability of storing objects within the object storage platform 160 having the offline-replica bits set to enable secondary storage to tape or other secondary storage devices and the other features and functionality described above, one additional aspect of the disclosure involves the ability to implement the backup of the objects to a selected second storage device. Completion of this backup process occurs within a data backup system configuration as illustrated by FIG. 6. Data backup system 600 comprises application server, which for purposes of continuity is assumed to be IHS 100 and is thus interchangeably referred to herein as application server 100. Application server 100 is communicatively connected to and can provide data to object storage platform 160 for storage thereon, as previously described. Depending on the specific application, the data provided to object storage platform 160 can be application data from processes executing on application server 100 or other types of data. A backup server 170 is communicatively coupled to object storage platform 160 and also to second storage device 610. Backup server 170 is also an information handling system and includes one or more processors and program code or firmware that executes on the processor to provide the various features described herein as being attributable to backup server 170 and/or backup program 175. As illustrated, backup server 170 includes therein backup program 175, which has an associated backup tracking table 700 (see FIG. 7). According to one implementation, object storage platform can be a CAS and second storage device can be a tape backup system.

According to one implementation, the application server can be a cluster of servers, the data storage platform can comprise an array of disks, and the secondary storage device can be one or more tape drives/silos. With the configuration of servers and storage facilities, data backup system 600 enables data from an application server 100 to be stored to an object storage platform (e.g., a CAS) as an immutable or a mutable object. Data backup system 600 also enables the object to be stored with specific metadata values that can enable the objects to be later accessed and backed-up to a second storage device via operations of backup server 170 and storage controller (not shown) of object storage platform 160.

Figure 8:
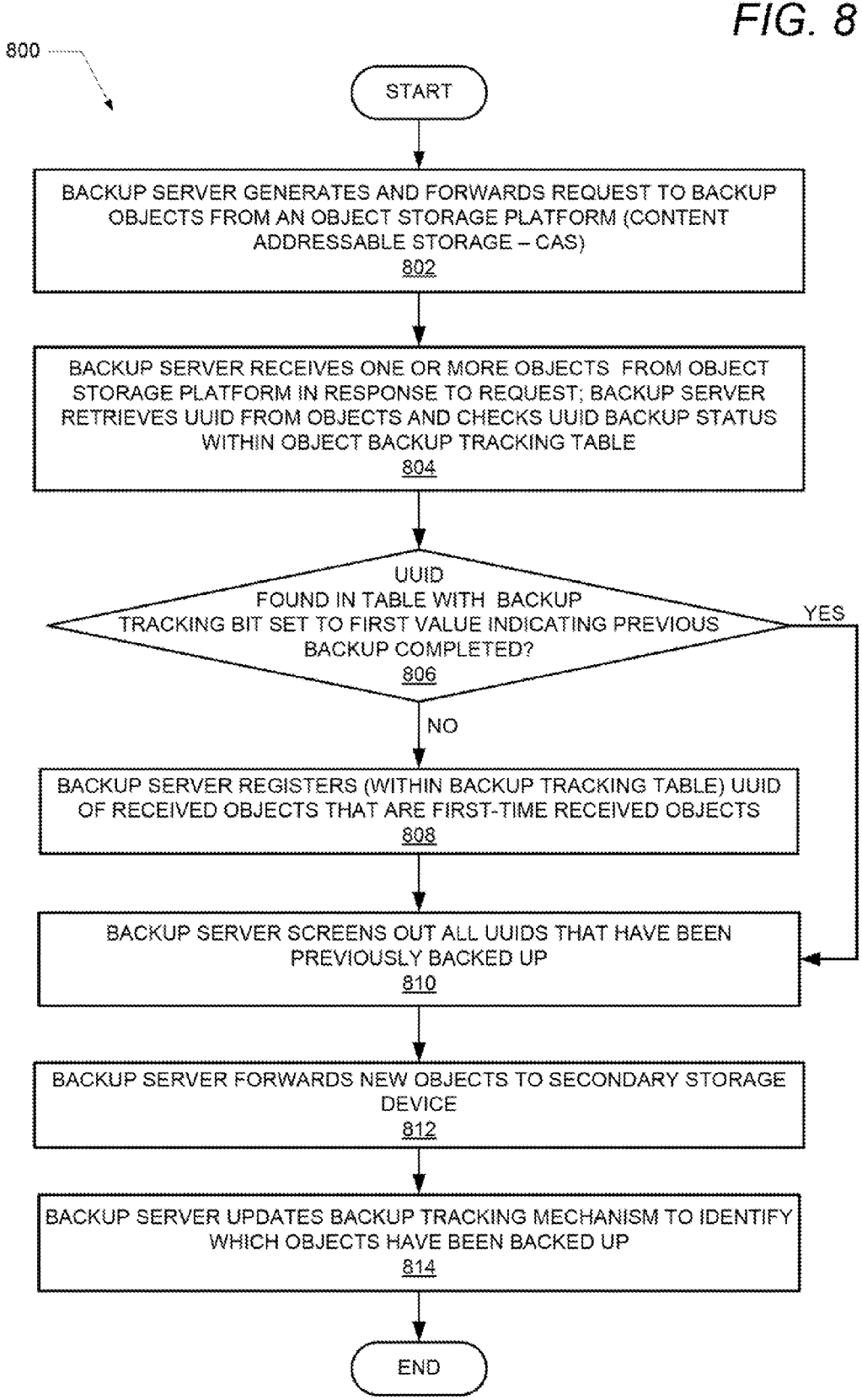

Certain of the processing performed by backup server 170 and/or execution of backup program 175 are illustrated by method 800 of FIG. 8. Specifically, method 800 provides efficient backup of objects from an object storage platform. Method 800 begins with start block and proceeds to block 802 which indicates a processor of a backup server 170 (e.g., an information handling system) forwarding a first/initial request to a storage controller of an object storage platform 160 to back-up (to a secondary storage device) data objects that are stored on the object storage platform 160. In response to receipt of one or more objects from the object storage platform, where the objects are received in response to the first/initial request: the method 800 includes the backup server updating a tracking mechanism to identify which objects from the object storage device have been backed-up to the secondary storage. In one embodiment, the backup tracking mechanism comprises backup tracking table 700 (FIG. 7). As shown, backup tracking table 700 includes a column indicating the UUID of objects that have been registered in the object storage platform 160 as of the last periodic check made by backup server 170. Backup tracking table 700 also includes, for each UUID, an indicator (e.g., a bit value) that is utilized to indicate when the associated object has been backed up to second storage device 610. This indicator is set by backup server 170 once a backup of the object is completed. According to one embodiment, backup tracking table 700 is maintained in nonvolatile storage and is persistent.

Returning to the processes presented by method 800, method 800 includes the backup server 170 updating the tracking mechanism by (a) retrieving a Universally Unique Identifier (UUID) from each object returned by the first request and (b) registering the UUID within a back-up mapping table 700. When the request is not the initial (i.e., the absolute first) request, the method 800 comprises the backup server retrieving the UUID and checking the back-up status associated with that UUID within object backup tracking/mapping table (block 804). In one embodiment, method 800 includes accessing a listing of UUIDs within the back-up mapping table 700, which identifies which objects have been previously backed up. Method 800 further includes determining at block 806 which of the returned UUID has its backup tracking bit set to a value that indicates the object has been previously backed up.

From decision block 806, in response to the UUID not being found in the backup tracking table 1000, backup server 170 registers, within the backup tracking table, the UUIDs of all first time received objects (or UUIDs) (block 808). In response to the received UUIDs including UUIDs in the table of objects that have been previously backed up, the method 800 also includes screening out those objects that have been previously backed up (block 810). These objects are then prevented from being backed up again in response to a second request (i.e., not the absolute first or initial request) and subsequent requests to back up objects from the object storage platform. Method 800 then includes backup server 170 forwarding the one or more objects to the second/secondary storage device 610 (block 812). Method 800 further includes backup server 170 updating the backup tracking table to indicate which UUIDs have already been backed up (block 814). Method 800 then ends. Thus, according to one embodiment, method 800 can include backup server 170, in response to generating a second request to back up objects from the object storage platform: identifying which objects have been previously backed up; and backing up to the second/secondary storage device only those objects that have not previously been backed up. According to one aspect of the disclosure, the above method processes are performed by an information handling system, such as described in FIG. 1 comprising a processor (105) and program code that executes on the processor to perform the above method functions.

To support the above method functions, the storage controller 162 has to be configured to recognize and process metadata with offline-replica bits or similar structures associated with a data object. Storage controller 162 should also be configured to respond to a request for data backup as described herein. Notably, by setting the backup mode to 0 or 1, backup program 175 executing on backup server 170 can implement backup strategies common for regular file backups on an object storage platform 160.

FIG. 9 is a flow chart illustrating one embodiment of a method 900 by which the storage controller 162 and/or processing logic of backup server 170 interact to support the backup functionality described herein. Method 900 begins at start block and proceeds to block 902 which illustrates the storage controller 162 querying (or receiving a query for) backup of an object. According to one embodiment, the backup policy by which the backup operations are triggered can be established via a backup policy provided by backup program 175. In one implementation, backup policy can include information such as which page identifiers (e.g., UUID) are to be queried for backup based on indicated need or compliance requirements, for example, at what interval to perform the backup, and to which second storage devices certain objects should be backed up, etc. In one embodiment, the backup policy can be maintained at storage controller 162 as a part of the metadata associated with the particular data or a separate data block maintained by the storage controller 162. Alternatively, as presented by the described embodiments, the backup policy can also be maintained at backup server 170, in one embodiment, e.g., within backup tracking table 700 of backup program 175, such that backup server 170 controls all backup processes, independent of the storage controller 162.

In response to receiving the query, method 900 comprises storage controller 162 determining at block 904, whether the requested object requires or is indicated as being approved for an offline replica (i.e., whether the objects offline-replica bit value equals the first value (1) that indicates a backup of the object is desired). In response to the requested object not requiring an offline replica, method 900 skips the object (block 906). However, in response to the object requiring an offline replica, method 900 includes the storage adapter exposing the object to the backup program (or backup process) (block 908). Following, at block 910, a check of the object characteristics (from metadata) is performed to determine whether the object is mutable. In response to the object being mutable, a next check is made at block 912 to determine whether the object has changed since the last/previous backup of the object. In response to the object having been changed since the last backup of the object, method 900 includes retrieving a copy of the object from the data storage platform and backing up the object (block 918).

However, in response to the object not being mutable at block 910, method 900 comprises performing a next check at block 914 to determine whether the object backup mode equals a first backup mode value (e.g., 1), which would indicate that the object has already been backed up and does not need to be backed up again. In one embodiment, the check for the first backup mode value is performed in the backup tracking table 700 by backup server 170. In response to the immutable object not having the first backup mode value (i.e., not needing to be backed up or having been previously backed up), method 900 includes skipping the object (block 906). In response to the object backup mode value indicating that the immutable object is to be backed up, method 900 includes backing up the object (block 918). Once the object has been backed up, the method 900 comprises setting the object backup mode in the backup program database to the first value, which indicates the object has been backed up (block 920). According to one or more embodiments, when an object is not found in the backup program database and the object has an offline-replica bit value that is (equal to) the first value, the object will be backed up in the current backup cycle.

According to one embodiment in which a group-level or platform-level backup is implemented, method 900 can comprises, in response to receiving a request for backup of one or more objects from the object storage platform: identifying which of the one or more objects stored within the object storage platform have an offline-replica bit value that is the first value; and providing, in response to the request, only those objects requested that have the their offline-replica-bit value equal to the first value. Method 900 can thus further comprise ignoring the request for any object without an offline-replica bit within its metadata and any object whose offline-replica bit value is not the first value.

According to one aspect of the disclosure, the above method can be performed by one of (a) a storage controller for an object storage platform, where the storage controller comprises a processing unit/device and firmware that when executed by the processing unit completes the method functions; and (b) an information handling system that comprises the storage controller with similar functionality.

With the above described features and functions, the inherent issues caused by lack of a tape backup option for CAS systems (i.e., object backup from the object storage platform) is alleviated. One or more aspects of the disclosure involve providing the ability within a CAS storage system to support backing up of immutable objects, without utilizing network data management protocol (NDMP). Unlike with traditional types of files and file systems which support backup functionality, such functions are not available on an object storage platform, without the features described herein. Also, because the storage system can hold billions of objects, one aspect of the disclosure recognizes that performing an indiscriminate back up of everything on the object storage platform could take a substantially long time and may not be necessary, as not all data need to be backed up every time a backup operation occurs.

In the above described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a GPU, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:

a processor of a data processing system receiving a request to store a first set of data to an object storage platform that supports content addressable storage;

in response to the request, generating a query for selection of a parameter value indicating whether the first set of data is to be made accessible for secondary storage to a second storage device following an initial storage on the object storage platform;

in response to receiving a first value as a response to the query: tagging the first set of data with a tag that indicates that secondary storage of the first set of data is approved, wherein tagging the first set of data to indicate that secondary storage of the first set of data is approved comprises setting an offline-replica bit within a metadata of the corresponding first object to a first value, which indicates that secondary storage of the first set of data is approved, wherein when the secondary storage is not approved for the first object, the offline-replica bit is automatically set to a second, default value; and forwarding the first set of data to a storage controller of the object storage platform along with the tag to allow the storage controller to identify a corresponding first object created from the first set of data as being available for secondary storage, wherein the storage controller stores the first set of data as a corresponding first object within the object storage platform and the storage controller is configured to identify the first object as being available for secondary storage, based on a presence of the tag; and in response to receiving a second value as a response to the query: tagging the first set of data to indicate that secondary storage of the first set of data is not approved; and forwarding the first set of data to the storage controller of the object storage platform, wherein the storage controller stores the first set of data as a corresponding first object within the object storage platform and the storage controller does not identify the first object as being available for secondary storage; and in response to not receiving a response to the query within a pre-set timeout period, forwarding the first set of data to a storage controller of the object storage platform, wherein the storage controller stores the first set of data as a corresponding first object within the object storage platform and the storage controller does not identify the first object as being available for secondary storage, wherein all data provided to the storage controller that are not expressly tagged to indicate access for secondary storage are stored as objects with a default to not allow access for secondary storage.

2. The method of claim 1, further comprising:
in response to not receiving a response to the query within a pre-set timeout period, tagging the first set of data to indicate that secondary storage of the first set of data is not approved; and
wherein the storage controller stores the first set of data as a corresponding first object within the object storage platform and the storage controller does not identify the first object as being available for secondary storage.

3. An information handling system configured with the processor and program code that when executed by the processor completes the functions of claim 1.

4. A storage controller for an object storage platform, the storage controller comprising a processing unit and firmware that when executed by the processing unit completes the functions of claim 1.

5. The method of claim 1, further comprising:
the storage controller of the object storage platform receiving the first set of data for storage on the object storage platform;
generating a first object corresponding to the first set of data;
assigning a Universally Unique Identifier (UUID) to the first object;
checking a value of an offline-replica bit within metadata received with the first set of data and which metadata is appended to the first object; and
in response to the offline-replica bit value being a first value, tagging the first object to identify the first object as being available for secondary storage to a second storage device; and
storing the first object within the object storage platform.

6. The method of claim 5, further comprising:
in response to the value of the offline-replica bit within the metadata being a second value, storing the first object without a tag indicating that the first object is available for secondary storage.

7. The method of claim 5, further comprising:
in response to the metadata not containing an offline-replica bit value, storing the first object.

8. The method of claim 5, further comprising:
in response to receiving a request for backup of one or more objects from the object storage platform:
identifying which of the one or more objects stored within the object storage platform have an offline-replica bit value that is the first value; and
providing in response to the request only those objects requested that have the first value as their offline-replica bit value.

9. The method of claim 8, further comprising ignoring the request to backup any object without an offline replica bit within its metadata and any object whose offline-replica bit value is not the first value.

10. The method of claim 1, further comprising:
a processor of an information handling system forwarding a first request to the controller of the object storage platform to back-up data objects that are stored on the object storage platform to a secondary storage device;
responsive to receipt of one or more objects from the object storage platform in response to the first request:
forwarding the one or more objects to the secondary storage device; and
updating a tracking mechanism that identifies which objects from the object storage device have been backed-up to the secondary storage; and
in response to generating a second request to back up objects from the object storage platform: identifying which objects have been previously backed up; and backing up to the secondary storage device only those objects that have not previously been backed up.

11. The method of claim 10, wherein updating a tracking mechanism comprises:
retrieving a Universally Unique Identifier (UUID) from each object returned by the first request; and
registering the UUID within a back-up mapping table.

12. The method of claim 11, wherein the identifying which objects have been previously backed up comprises:
accessing a listing of UUIDs within the back-up mapping table identifying which objects have been previously backed up; and
screening out those objects that have been previously backed up from being backed up in response to the second request and subsequent requests to back up objects from the object storage platform.

* * * * *